United States Patent Office

3,125,417
Patented Mar. 17, 1964

3,125,417
PREPARATION OF CARBONYL SULFIDE
Raymond A. Franz and Richard N. Moore, St. Louis, Mo., assignors to Monsanto Chemical Company, St. Louis, Mo., a corporation of Delaware
No Drawing. Filed Dec. 29, 1961, Ser. No. 163,023
7 Claims. (Cl. 23—203)

The present invention relates to carbonyl sulfide. More particularly, the present invention relates to a new and improved process for the preparation of carbonyl sulfide.

The preparation of carbonyl sulfide from carbon monoxide and sulfur is relatively well known to the art. Methods have been developed for the high temperature conversion of CO and S to carbonyl sulfide [COS]. Other methods have been developed which may produce COS from CO and S at temperatures as low as 25° C. Among this latter group of methods is the one disclosed in U.S. Patent No. 2,992,898 by which CO and sulfur are reacted to produce COS at temperatures of 25 to 300° C. in the presence of a liquid hydroxy-substituted tertiary aliphatic amine. This process provides a very useful method of preparing COS. However, it requires sulfur in the elemental state as a raw material and thus has the disadvantage of requiring rather costly sulfur production or recovery means on the plant site or else the expense of transporting the sulfur, in many instances, great distances. Further, this process necessitates the maintenance of rather extensive storage facilities for the elemental sulfur in order that a sufficient supply of sulfur will always be immediately available at the plant site. Yet, another disadvantage found in this type of process is the cost of handling and introducing the elemental sulfur into the reaction mixture.

It is then an object of the present invention to provide a new and improved process for the preparation of carbonyl sulfide. A more particular object of the present invention is to provide a process for the preparation of carbonyl sulfide from hydrogen sulfide, sulfur dioxide and carbon monoxide. Additional objects will become apparent from the following description of the invention herein disclosed.

In fulfillment of these and other objects, it has been discovered that carbonyl sulfide may be produced from hydrogen sulfide, sulfur dioxide and carbon monoxide by a process which comprises passing hydrogen sulfide and sulfur dioxide simultaneously into a tertiary amine at 10 to 200° C. for a period of time and then stopping entry of the hydrogen sulfide and sulfur dioxide and subsequently introducing carbon monoxide into the amine solution while maintaining the temperature of the amine solution at 25 to 300° C. Introduction of the $H_2S$ and $SO_2$ into the tertiary amine causes an exothermic chemical reaction to take place. Accompanying the exothermic chemical reaction is a substantial increase in temperature which is generally sufficient to cause the water produced by the reaction to distill from the reaction mass. The water distilled from the reaction mass is in azeotropic admixture with the tertiary amine.

To further describe and to illustrate the present invention, the following examples are presented. These examples are in no manner to be construed as limiting to the present invention.

*Example I*

Into a 3-necked flask of 500 ml. capacity were charged 127 grams of N,N-di-isopropylethanolamine. To one of the three necks was attached a distilling head. Through each of the two remaining necks of the flask were introduced simultaneously hydrogen sulfide and sulfur dioxide. These two gases were bubbled through the amine at a rate of 10 bubbles per second of $H_2S$ and approximately 5 bubbles per second of sulfur dioxide. The temperature was initially normal room temperature, approximately 20–22° C. The temperature gradually increased to approximately 130° C. at which temperature distillation of an amine-water azeotrope through the distilling head began. Introduction of the $H_2S$ and $SO_2$ was continued until the reaction mass became extremely viscous at which time it was stopped. Throughout this period the distillation of the amine-water azeotrope continued with the temperature remaining within the range 130° to 150° C. Approximately 49 ml. of liquid was found to have distilled from the reaction mixture. The amine lost from the reaction flask by the azeotropic distillation was replaced. Next, carbon monoxide was bubbled through the reaction mass at a rate of 15 ml./min. The temperature during the CO entry was maintained at approximately 99° C. After one hour, a sample of the gas exiting the reaction mass was taken. On analysis of this gas, the reaction products were found to contain approximately 81.1 mol. percent COS.

*Example II*

The process of Example I is repeated using N,N-dimethylethanolamine as the reaction medium. A good yield of COS is obtained.

*Example III*

The process of Example I is repeated using triethanolamine as the reaction medium. A good yield of COS is obtained.

*Example IV*

The process of Example I is repeated using N-hydroxyethylmorpholine as the reaction medium. A good yield of COS is obtained.

*Example V*

The process of Example I is repeated using tetrahydroxyethylethylenediamine as the reaction medium. A good yield of COS is obtained.

*Example VI*

The process of Example I is repeated using N,N-dibutylisopropanolamine as the reaction medium. A good yield of COS is obtained.

*Example VII*

The process of Example I is repeated using tri-isopropanolamine as the reaction medium. A good yield of COS is obtained.

*Example VIII*

The process of Example I is repeated using N,N-di-[2-ethylhexyl]-ethanolamine as the reaction medium. A good yield of COS is obtained.

*Example IX*

The process of Example I is repeated using N,N-dimethylisopropanolamine as the reaction medium. A good yield of COS is obtained.

*Example X*

The process of Example I is repeated using N-butyldiisopropanolamine as the reaction medium. A good yield of COS is obtained.

*Example XI*

The process of Example I is repeated using N-ethyldiethanolamine as the reaction medium. A good yield of COS is obtained.

*Example XII*

The process of Example I is repeated using N-3-hydroxypropylmorpholine as the reaction medium. A good yield of COS is obtained.

*Example XIII*

The process of Example I is repeated using N-4-hydroxybutylmorpholine as the reaction medium. A good yield of COS is obtained.

*Example XIV*

The process of Example I is repeated using N-methylpiperidine as the reaction medium. A good yield of COS is obtained.

*Example XV*

The process of Example I is repeated using N-methylmorpholine as the reaction medium. A good yield of COS is obtained.

*Example XVI*

The process of Example I is repeated using methyldiethylamine as the reaction medium. A good yield of COS is obtained.

The amines which may be utilized in the present process as reaction mediums are tertiary amines. Non-limiting exmaples of tertiary amines are tert.-alkanol amines, tert.-alkyl amines, N-substituted pyridines, N-alkyl piperidines, N-alkyl morpholines, N,N-alkyl dialkanol amines, N,N-dialkyl alkanol amines, etc. The tertiary amines which are preferred for the purposes of the present invention are the N,N-dialkyl alkanolamines. The alkyl groups and the alkanol group may be straight or branched chain. Several non-limiting examples of such amines are N,N-dimethyl ethanolamine, N,N-diethyl ethanolamine, N,N-dipropyl pentanolamine, N,N-diethyl - 4 - hexanolamine, N,N-2-methylhexyl - 2 - ethylpentylisopropanolamine, etc. The tertiary amines which are particularly preferred in the present invention are the N,N-dialkyl alkanolamines in which the alkyl groups and the alkanol group contain 1 to 4 and 1 to 3 carbon atoms respectively.

The quantity of amine used as the reaction medium in the present process may be varied substantially. There should be enough amine present that the reaction mass remains fluid at all times. This fluidity of the reaction mass should be sufficient to permit good mixing of the reactants throughout the reaction period. Usually, it will be preferred to maintain an amount of amine during $H_2S$ and $SO_2$ introduction sufficient to maintain at least a mol/mol ratio of amine to $H_2S$ or $SO_2$ whichever is smaller in amount. During CO addition to the reaction mass, the amount of amine should be preferably maintained at that which will impart good fluidity to the reaction mass.

The reactants to the first portion of the present process, the introduction of $H_2S$ and $SO_2$ into the amine, may be present in virtually any amount relative to one another. However, it is generally preferred that they be used on a mol ratio basis of 2 mols of $H_2S$ for one mol of $SO_2$. The amount of CO introduced into the last step of the present process may be varied substantially, but preferably is introduced in an amount slightly in excess of that necessary for a 3:1 mol ratio to the amount of $SO_2$ introduced in the first portion of the present process.

The exact nature of the reaction which takes place upon entry of the hydrogen sulfide and sulfur dioxide into the tertiary amine is not known at the present time. However, it is believed that the reaction produces sulfur according to the following equation.

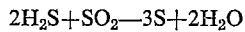
$$2H_2S + SO_2 \rightarrow 3S + 2H_2O$$

If this equation represents the reaction taking place in the tertiary amine, then the present process has an added advantage in providing a novel method for producing sulfur by the reaction of $H_2S$ and $SO_2$.

The temperature at which the $H_2S$ and $SO_2$ entry is initiated may range from 10 to 200° C., but more preferably from 20 to 160° C. The most preferred initial entry temperature is at room temperature, e.g. 20 to 30° C. As the exothermic reaction takes place in the amine, there will be a temperature increase. Generally, the temperature will not rise above the 200° C. upper limit, however. The initial entry temperature may be at ambient temperatures or below or the reaction medium may be heated to virtually any temperature within the above range prior to entry or the reactants by the use of external heat. The temperature during the second phase of the present process, the carbon monoxide entry, may range from as low as 25° C. to as high as 300° C., but preferably will be maintained within the limits of 25 to 150° C.

The total amount of $H_2S$ and $SO_2$ which is added to the tertiary amine reaction medium prior to stopping entry of these two reactants may vary substantially. If no additional amine is to be added during entry of the $H_2S$ and $SO_2$, the entry of these reactants should be stopped before the reaction mass becomes viscous to the point of losing its fluidity. The addition of more amine to the reaction mass during introduction of $H_2S$ and $SO_2$ will of course extend the length of time and amount of $H_2S$ and $SO_2$ which may be reacted during the first portion of the process.

The temperature at which the amine-water azeotrope will distill from the reaction mass will vary according to the amine being used. The heat for this distillation is generally provided by the exothermic heat of reaction of the $H_2S$ and $SO_2$ in the reaction mass. If desired, however, external heat may be added to bring about a more rapid distillation.

Reaction pressure is not critical to the present invention in any of its steps. Atmospheric pressures or slightly above, e.g., up to 25 p.s.i.g., will usually suffice and are preferred. Higher pressures, e.g. up to 2000 p.s.i.g., may be used in the last step of the present process. However, due to the removal by distillation of the water from the reaction of the first step, pressures should not be used which will necessitate distillation temperatures above about 250° C. or more preferably above 200° C.

Whether or not fresh amine is added to the reaction mass after distillation of the amine-water azeotrope will depend upon the fluidity of the reaction mass after distillation. The only function of the addition of this fresh amine is to reduce the viscosity of the reaction mass to insure better mixing of the reactants.

The present process, though exemplified as a batch process may be adapted to a continuous process. For example, $H_2S$ and $SO_2$ may be continuously countercurrently contacted with a tertiary amine, with an amine-water azeotrope being continuously taken off as an overhead and the residue continuously fed into a distillation unit wherein additional water is distilled from the mixture, stripped residue being continuously removed from this distillation to another tower where it is countercurrently contacted with CO. This exemplary description is not to be construed as limiting, but merely as illustrative of a continuous process using the present invention.

There are a number of advantages accruing from the present invention. Most refineries and chemical plants of any size and diversity have surplus $H_2S$ and $SO_2$. In fact, in many instances, disposal of these gases presents a problem within itself. The present process allows disposal of these materials and recovery of a valuable product as a result. Another advantage of the present process is in the ease with which the gaseous reactants may be handled as compared with such materials as elemental sulfur. Still another advantage is found in the lack of necessity for extensive procedures to recover unreacted reactants, since the $H_2S$ and $SO_2$ used is more often than not waste material. The present process utilizes CO which is also a gas produced as a by-product in many industries and which often creates a problem of disposal also. The natural fluidity of all of the reactants of the present process makes the production of COS in a continuous process very attractive. Therefore, it is easily seen that the present invention represents a very substantial improvement in the art of producing carbonyl sulfide.

The product COS may be recovered from the reaction gases by any method known to the art. It may be recovered by such methods as solvent extraction, low temperature condensation, adsorption, etc.

We claim:

1. A process for the production of carbonyl sulfide which comprises introducing a mixture consisting essentially of hydrogen sulfide and sulfur dioxide into a reaction medium consisting essentially of a tertiary amine at a temperature of 10 to 200° C., stopping the entry of the hydrogen sulfide and sulfur dioxide and subsequently introducing carbon monoxide into the amine solution at a temperature of 25 to 300° C. and recovering therefrom a gas stream containing a substantial amount of carbonyl sulfide.

2. The process of claim 1 wherein the hydrogen sulfide and sulfur dioxide are introduced into the tertiary amine at an initial temperature of 20 to 30° C.

3. The process of claim 1 wherein the tertiary amine is an N,N-dialkyl alkanolamine.

4. The process of claim 1 wherein the carbon monoxide is introduced into the tertiary amine at a temperature of 25 to 150° C.

5. The process of claim 1 wherein the tertiary amine is N,N-di-isopropylethanolamine.

6. A process for the production of carbonyl sulfide which comprises introducing a mixture consisting essentially of hydrogen sulfide and sulfur dioxide into a reaction medium consisting essentially of a tertiary amine at a temperature of 10 to 200° C., thereby causing an exothermic chemical reaction, in which an amine-water azeotrope is produced and continuously removed overhead, stopping entry of the hydrogen sulfide and sulfur dioxide, and subsequently introducing carbon monoxide into the tertiary amine reaction mass at a temperature of 25 to 300° C., and recovering therefrom a gaseous product containing a substantial amount of carbonyl sulfide.

7. A process for the production of carbonyl sulfide which comprises introducing hydrogen sulfide and sulfur dioxide into a contacting tower and passing the hydrogen sulfide and sulfur dioxide into countercurrent contact with a tertiary amine, the contacting temperature being 10 to 200° C., taking as an overhead product from the contacting tower an amine-water azeotrope, recovering as a bottom product from the contacting tower the amine-hydrogen sulfide-sulfur dioxide reaction mass which is subsequently passed into countercurrent contact with a flow of carbon monoxide at a temperature of 25 to 300° C., recovering for this contacting as an overhead product, a gas stream containing a substantial amount of carbonyl sulfide.

References Cited in the file of this patent

UNITED STATES PATENTS

| | | |
|---|---|---|
| 2,087,889 | Bacon et al. | July 27, 1937 |
| 2,992,896 | Applegath et al. | July 18, 1961 |
| 2,992,898 | Applegath et al. | July 18, 1961 |
| 3,023,088 | Urban | Feb. 27, 1962 |